(12) United States Patent
Arena et al.

(10) Patent No.: US 7,769,659 B2
(45) Date of Patent: Aug. 3, 2010

(54) SYSTEM, METHOD, AND COMPUTER PROGRAM PRODUCT FOR COST EFFECTIVE, DYNAMIC ALLOCATION OF ASSETS AMONG A PLURALITY OF INVESTMENTS

(75) Inventors: Robert Arena, Farmington, CT (US); N. David Kuperstock, Woodbridge, CT (US); Robert O'Donnell, Harwinton, CT (US); Lincoln Collins, Trumbull, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 2461 days.

(21) Appl. No.: 10/076,739

(22) Filed: Feb. 15, 2002

(65) Prior Publication Data

US 2002/0174045 A1 Nov. 21, 2002

Related U.S. Application Data

(60) Provisional application No. 60/269,413, filed on Feb. 16, 2001.

(51) Int. Cl.
G06Q 40/00 (2006.01)
(52) U.S. Cl. .................. 705/36 R; 705/35; 705/36; 705/37
(58) Field of Classification Search ............ 705/35, 705/36, 37, 36 R, 36 T
See application file for complete search history.

(56) References Cited

U.S. PATENT DOCUMENTS

| | | | |
|---|---|---|---|
| 5,126,936 A | 6/1992 | Champion et al. | |
| 5,631,828 A | 5/1997 | Hagan | |
| 5,812,987 A | 9/1998 | Luskin et al. | |
| 5,933,815 A | 8/1999 | Golden | |
| 6,021,397 A | 2/2000 | Jones et al. | |
| 6,088,685 A | 7/2000 | Kiron et al. | |
| 6,092,056 A | 7/2000 | Tull, Jr. et al. | |
| 6,219,650 B1 | 4/2001 | Friend et al. | |
| 6,278,983 B1 | 8/2001 | Ball | |
| 6,292,787 B1 * | 9/2001 | Scott et al. | 705/36 R |
| 6,601,044 B1 * | 7/2003 | Wallman | 705/36 R |
| 6,611,815 B1 | 8/2003 | Lewis et al. | |
| 6,687,681 B1 * | 2/2004 | Schulz et al. | 705/36 T |
| 7,031,937 B2 * | 4/2006 | Brown et al. | 705/36 T |
| 2001/0014873 A1 | 8/2001 | Henderson et al. | |

* cited by examiner

Primary Examiner—Nga B. Nguyen
(74) Attorney, Agent, or Firm—Baker Botts L.L.P.

(57) ABSTRACT

A system, method, and computer program product for dynamic, cost effective reallocation of assets among a plurality of investment products comprising a processor, a memory and a computer program stored in the memory. The computer program implementing the present invention controls the reallocation of assets to reduce the transactions costs associated with rebalancing the investor's composite assets according to a composite asset allocation model. Information relating to the composite asset allocation model, the investor's assets, and the investor are stored in memory. Periodically, or upon occurrence of an event, the composite assets are evaluated to determine if rebalancing is necessary. If rebalancing is necessary, the transaction costs associated with the available transactions for performing the rebalancing are compared to select the most economically favorable transaction. Thus, the reallocation is achieved by selecting the least costly transaction that will serve to realize the composite asset allocation model, which is independent of the structure of the investor's portfolio among particular accounts or products. In addition, the computer program compares the available options for recovery of the transaction fees to select the most economically favorable means of recovering the fees associated with the transaction to further reduce the transaction cost of the reallocations.

26 Claims, 4 Drawing Sheets

Model A

| Level I | Stock | Bond | Cash |
|---|---|---|---|
| Level II | Small Cap<br>Aggressive<br>Growth<br>Growth & Income<br>Growth<br>Foreign | High Yield<br>Int. Long Term<br>Short Term<br>Global | Cash |
| Level III | Fund-Level Allocations | | |

Model B

| Level I | Stock | High Yield | Money Market |
|---|---|---|---|
| Level II | Small Cap<br>Aggressive<br>Growth<br>Growth & Income<br>Growth<br>Foreign | | |
| Level III | Fund-Level Allocations | | N/A |

Model C

| Level I | 60% Stock | 30% Bond | 10% Cash |
|---|---|---|---|
| Level II | 50% - Small Cap<br>20% - Aggressive Growth<br>10% - Growth & Income<br>10% - Growth<br>10% - Foreign | 30% - High Yield<br>25% - Int. Long Term<br>25% - Short Term<br>20% - Global | 100% - Cash |
| Level III | Fund-Level Allocations | | |

Model D

| Level I | 30% - Small Cap<br>12% - Aggressive Growth<br>6% - Growth & Income<br>6% - Growth<br>6% - Foreign | 9% - High Yield<br>7.5% - Int. Long Term<br>7.5% - Short Term<br>6% - Global | 10% - Cash |
|---|---|---|---|
| Level II | Fund-Level Allocations | | |

SYSTEM, METHOD, AND COMPUTER PROGRAM PRODUCT FOR COST EFFECTIVE, DYNAMIC ALLOCATION OF ASSETS AMONG A PLURALITY OF INVESTMENTS

CROSS REFERENCE TO RELATED APPLICATION

This non-provisional application claims the benefit of the earlier filing date of, and contains subject matter related to that disclosed in, U.S. Provisional Application Serial No. 60/269,413, filed Feb. 16, 2001, and having common inventorship, the entire contents of which are incorporated herein by reference.

BACKGROUND OF THE INVENTION

1. Field of the Invention

The present invention relates, generally, to investment portfolio management and asset allocation, and more particularly, to a system, method, and computer program product for dynamic allocation of assets among a plurality of investment products and options in a cost effective manner.

2. Description of Related Art

Investment strategies typically involve asset allocation, which is the distribution of investment assets among a variety of investment opportunities in order to provide a particular balance of risk and return. For example, equities generally provide a higher potential return on investment than bonds, but at a higher risk of potential loss. Cash generally provides a fixed return on investment with no risks.

To assist investors, financial services companies generally provide asset allocation models with recommended allocation percentages among classes of investments. An Aggressive model for a young investor may include 85% stock and 15% bond investment to provide the potential for capital growth. A Balanced model for a middle-age investor may include 65% stock, 25% bond, and 10% cash investment to provide some growth potential with reduced risk. Likewise, a Conservative model for an elderly investor may include 30% stock, 55% bond, and 15% cash to provide minimal risk.

When an investor purchases an investment product, such as a variable annuity, mutual funds, and so on, the initial investment is allocated among the investment options within the product according to the specified asset allocation model. As time passes, the percentage of the investor's assets in each investment class is likely to diverge from the initial allocation. For example, after a number of "bull" years, the increase in value of an investor's equities is likely to exceed the increase in value of the investor's bonds. As a result, the percentage of the investor's assets in equities will be higher than the initial allocation, and the percentage of assets in bonds will be lower than the initial allocation.

To maintain the investor's preferred asset allocation within a product, a periodic or event-driven re-evaluation and reallocation of assets is generally performed, which is commonly referred to as "rebalancing." In the aforementioned bull market scenario, some of the investor's equities are sold and additional bonds are purchased so as to restore the desired percentages. In a like manner, in a bear market, wherein the relative increase in value in the investor's bonds typically exceeds the increase in value in equities, a rebalancing is effected by selling some of the investor's bonds and purchasing additional equities.

The evaluation of an investor's assets is generally a continuous process, but the reallocation of resources is generally performed quarterly or whenever the degree of unbalance relative to the asset allocation model exceeds a given threshold.

In addition, the allocation percentages may be modified. For example, when the investor retires or experiences other lifestyle changes, the investor may request a different allocation of assets based on a different risk/return profile. The allocation may also be modified based on general or particular economic forecasts. For example, if a bear market is predicted, an investor may desire a larger allocation of assets in bonds or cash investments.

In many instances, a reallocation of resources generates one or more taxable events, wherein the investor is taxed on the profits made when an asset is sold. Additionally, the sale or purchase may incur fees that the financial services company charges for selling or buying equities. Other fees or costs associated with transactions include tax penalties, surrender charges, processing fees, administration fees, etc. These taxes and fees have the effect of reducing the value of the investment, and thereby the effective return-on-investment (ROI) realized.

Because each investment product may be managed and administered independently, and because different products are subject to different laws and securities regulations, the above asset allocation and rebalancing process is conventionally applied to each of the investor's products independently. For example, a person's retirement accounts (IRA, 401(K), SEP-IRA, etc.) are generally managed independent of the person's day-to-day investment accounts (brokerage accounts), and individual accounts within the same general category (retirement, brokerage) are also traditionally managed independently. Even when multiple accounts are jointly managed, the aforementioned allocation of resources is applied to each account or sub-account independently.

FIG. 1 is a representation in block diagram form of an example of such rebalancing according to the prior art in which each investment product is rebalanced independently. In this example, an investor is shown as having a variable annuity 110 and a set of mutual funds 120. Prior to rebalancing, the proportion of the stock assets amounts to seventy percent (70%) of the value of the annuity 110 and the bond assets amount to thirty percent (30%). Similarly, the mutual funds contain stock assets and bond assets, whose values amount to sixty percent (60%) and forty percent (40%) of the total mutual fund value, respectively.

A target model 150 is illustrated, which indicates that the desired ratio of stocks and bonds is fifty percent (50%) each. When this model 150 is used to rebalance the investor's assets, stocks in the variable annuity 110 are sold, and additional bonds purchased, so as to provide a rebalanced variable annuity 160 with half its value invested in stocks and half in bonds. In a like manner, the model 150 is applied to rebalance the mutual funds 120, again by selling stocks and purchasing bonds, to achieve the fifty/fifty (50/50) ratio of values between stocks and bonds.

Thus, in the conventional asset allocation among a mix of different products (in this example, a variable annuity and a set of mutual funds), each product is rebalanced independently. As a result, transaction costs may be incurred for each transaction within each investment product.

The buying and selling of assets, in most all cases, results in the investor incurring fees or expenditures that must be paid to perform the transaction. Typically, the fees are recovered from within the investment product in which the transaction occurred. For example, using the example above, the broker fees for rebalancing the mutual fund would be recovered by liquidating assets held in the mutual fund. In other instances, the fees are simply paid out of a cash account. Thus, the rebalancing of the prior art does not recover the fees in a manner that may further reduce the costs of the rebalancing by, for example, recovering the fees by liquidating assets from within a different investment product. Also, such independent rebalancing does not, and typically cannot, provide the most tax beneficial scenario for the investor since each transaction executed in connection with each product may have a different tax consequence for the investor.

Thus, notwithstanding the available asset allocation models and services for managing investment portfolios and implementing such models, there is a need for a system, method, and computer program product that provides for allocating assets among a plurality of investment products to achieve a desired allocation of assets in a cost effective manner. Further, there is a need for a system, method, and computer program product that provides such cost effective asset allocation, (1) that can manage transaction costs associated with allocating assets among a plurality of investment products by minimizing tax consequences and fees for rebalancing, (2) that can dynamically allocate assets among a plurality of investment products based on transaction costs, (3) that can identify transaction costs associated with performing rebalancing of assets among a plurality of investment products to achieve a desired asset allocation, and (4) that can manage rebalancing and recovery of transaction costs in a manner that increases the effective return-on-investment.

SUMMARY OF THE INVENTION

The primary object of the present invention is to overcome the deficiencies of the prior art described above by providing a system, method, and computer program product for cost effective, dynamic allocation of assets among a plurality of investment products.

Another object of the present invention is to provide a system, method, and computer program product for managing transaction costs associated with allocating assets among a plurality of investment products by minimizing tax consequences and fees for rebalancing.

Still another object of the present invention is to provide a system, method, and computer program product that can dynamically allocate assets among a plurality of investment products based on transaction costs.

Yet another object of the present invention is to provide a system, method, and computer program product for rebalancing assets to achieve a composite asset allocation model, while allowing individual accounts to diverge from this profile to increase the effective return-on-investment.

Another object of the present invention is to provide a system, method, and computer program product that can identify transaction costs associated with performing rebalancing of assets among a plurality of investment products to achieve a desired asset allocation.

Still another object of the present invention is to provide a system, method, and computer program product that can manage rebalancing and recovery of transaction costs in a manner that increases the effective return-on-investment.

The present invention achieves these objects and others by providing a system, method, and computer program product for cost effective, dynamic allocation of assets among a plurality of investment products, the system comprising a processor, a memory and a computer program stored in the memory.

The computer program implementing the present invention controls the allocation and reallocation of assets to reduce the transactions costs associated with rebalancing the investor's composite assets according to a composite asset allocation model. Information relating to the composite asset allocation model, the investor's assets, and the investor are stored in memory. Periodically, or upon occurrence of a triggering event, the composite assets are evaluated to determine if rebalancing is necessary. If rebalancing is necessary, the transaction costs associated with the available transactions for performing the rebalancing are compared to select the most economically favorable transaction for performing the rebalancing. Thus, the reallocation is achieved by selecting the least costly transaction that will serve to realize the composite asset allocation model, which is independent of the structure of the investor's portfolio among particular accounts or products. In addition, the computer program compares the available options for recovery of the transaction fees to select the most economically favorable means of recovering the fees associated with the transaction to further reduce the transaction cost of the reallocations.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein:

FIG. 4 is an illustration of example composite asset allocation models for use with the system, method, and computer program product of the present invention for cost effective, dynamic allocation of assets among a plurality of investments.

DETAILED DESCRIPTION OF THE INVENTION

I. General Design Concepts

Figure 1:
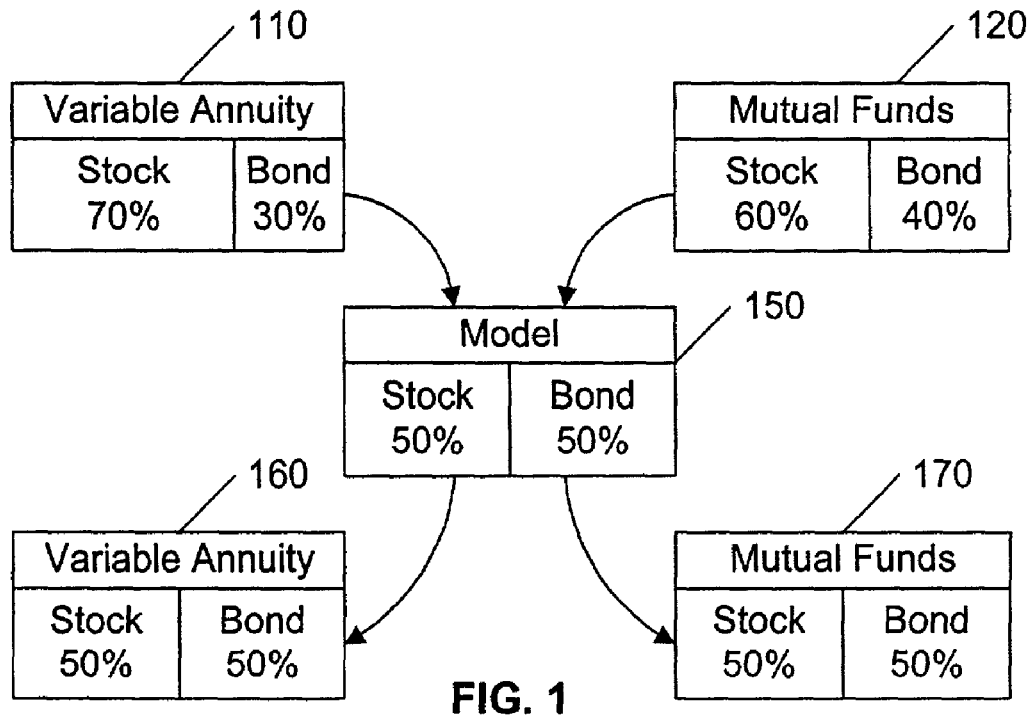
FIG. 1 is a representation in block diagram form of an example prior art mixed product asset allocation process.

In the following description, for purposes of explanation and not limitation, specific details are set forth, such as particular networks, systems, computers, terminals, devices, components, techniques, software products and systems, enterprise applications, operating systems, financial equations, financial formulas, financial algorithms, hardware, etc. in order to provide a thorough understanding of the present invention. However, it will be apparent to one skilled in the art that the present invention may be practiced in other embodiments that depart from these specific details. Detailed descriptions of well-known networks, systems, computers, terminals, devices, components, techniques, software products and systems, enterprise applications, operating systems, financial equations, financial formulas, financial algorithms, hardware are omitted so as not to obscure the description of the present invention.

A. Asset Classes and Sub-Classes

Three well-known asset classes are equity (stocks), bonds, and cash (such as investments in money markets, and other liquid assets). Further characterizations of these asset classes include a sub-class within each such as "small cap", "growth", and "foreign" equities, "high yield", "short term" and "global" bonds, and so on. These characterizations generally relate to the degree of risk and/or return associated with assets of each characterization type. For ease of understanding, the examples provided herein discuss an allocation of assets between equities, bonds, and cash. Also for ease of understanding, the examples discuss two investment products, a variable annuity and a mutual fund. The application of the principles of this invention to a more complex allocation of assets among other assets classes, among a variety of asset characterizations and a variety of investment products will be evident to one of ordinary skill in the art in view of this disclosure.

B. Transactions and Transaction Costs

As discussed previously, during rebalancing a liquidation of assets or investment in assets will generally incur transaction costs. The transaction costs that may be associated with rebalancing include, for example, any taxes, any benefits or penalties that may be realized by a transaction, any commissions or brokerage fees associated with a transaction, any bonuses (or losses) realized by maintaining (or not maintaining) a particular threshold balance in an account, administration and processing fees, and so on.

A "transaction" means the liquidations and purchases of investments associated with reallocating assets to effect a desired asset allocation as in rebalancing.

A variety of factors may influence the transaction costs associated with a specific transaction. For example, in the United States, a withdrawal from some retirement accounts incurs a tax penalty if the investor withdraws funds before a particular age. Similarly, the capital gains tax that is assessed on a transaction is dependent upon how long (short-term or long-term) the asset has been held by the investor. In like manner, the redemption value of a bond is often less than the value used for determining the investment value of the bond, the sell-price of an equity is often less than the market-price that is used to for determining the value of an equity, and so on. A transaction cost can be comprised of, for example, capital gains taxes (short and long term), tax penalties, income taxes, surrender charges, commissions, and transaction fees. These and other situation-dependent determinations of costs are common to one of ordinary skill in the art and therefore, are not repeated here. There also may be collateral benefits purchased in conjunction with, or as part of, one investment product (e.g., a death benefit calculated as a percentage of growth) that may be affected by transactions.

In addition, other costs and expenses associated with a transaction managed by the system, method, and computer program product of the present invention may include transaction costs such as, for example, a courier fee for transmitting documents to facilitate a transaction, earnings lost by the investor (e.g., for time spent) to facilitate the transaction, and travel costs.

For the purposes of this disclosure, a transaction cost may include any tangible or intangible benefit or detriment that occurs, or will occur, if the transaction is implemented and preferably a benefit or detriment that has an impact on the total after tax return on investment of the composite value of the invested assets.

As used herein, "cost" may be a positive or negative value, and may include savings or credits realized as a result of execution of a transaction. In addition, as used herein, the "least" or "smallest" transaction cost means the most economically favorable or otherwise most desirable transaction cost.

C. Investment Products

An investment product may hold one or more asset classes and sub-classes. A variable annuity is an investment product that may hold various classes of assets such as equity (stock), bonds, and cash. Likewise, a series mutual fund is another investment product that may hold various asset classes. In addition, one investment product may hold assets of another investment product. For example, an annuity may have a mutual fund as one its investment products.

As is well-known, some investment products have certain advantages or disadvantages with respect to certain types of transaction costs. For example, annuities are typically tax deferred meaning that liquidation of stock in an annuity will not incur a capital gains tax. This is in contrast to a mutual fund, which typically triggers a capital gains tax when assets are sold.

D. The Composite Asset Allocation Model

As discussed, conventional asset rebalancing among a mix of different products is accomplished by rebalancing each product independently. The present invention allows flexible construction and management of a composite asset allocation Model (CAAM or Model), which may include assets held in a plurality of investment products. Thus, instead of rebalancing each investment product according to the Model independently, the present invention coordinates rebalancing so that the composite assets of the investor are rebalanced according to the CAAM in a cost efficient method.

The CAAM may be designed by the investment advisor for a particular client (or group of clients) or by the investor and is, therefore, specific for a particular investor's (or group of investors') goals. Consequently, each Model may differ in form and substance from other Models as will be discussed below. For ease of discussion, the person or entity creating a Model, which may be an investment advisor, an investor, a financial institution, or other entity will be referred to as the "Model Creator."

FIG. 4 is an illustration of example composite asset allocation models for use with the system, method, and computer program product of the present invention for cost effective, dynamic allocation of assets among a plurality of investments.

1. Levels

Each CAAM of the present invention includes at least one Level and may include a plurality of Levels, each of which is defined by the Model Creator. Thus, different Models may have different numbers of Levels and the definition and role of a Level in one Model may be different in another model. Referring to FIG. 4, Model A includes three levels (Level I, II, and III).

2. Definitions

Each Level may be comprised of one or more Definitions. Each Definition is an element of a particular Level. Cash, bond, Small Value, and Growth are all examples of Definitions that might be established for a particular Model. The Model determines at what Level a Definition will be present. As shown in FIG. 4, Level I of Model A includes three Definitions, which are Stock, Bond, and Cash.

3. Definition Attributes

Definitions may include a Default attribute and an Availability attribute, both of which may be other Definitions or a particular investment. The Availability attribute identifies the available sub-allocations for the Definition and the Default attribute identifies the default sub-allocation for the Definition.

Referring to FIG. 4, the Availability attribute of the Stock Definition of Model A identifies Small Cap, Aggressive Growth, Growth & Income, Growth, and Foreign as the available sub-allocations for the Stock Definition. These sub-allocations (Small Cap, Aggressive Growth, Growth & Income, Growth, and Foreign) are shown as Definitions of Level II in Model A of FIG. 4.

The Default attribute identifies the preferred sub-allocation for that Definition provided the associated transaction cost(s) are equal to or less than the transaction costs associated with the alternate sub-allocations that will be used if no positive selection is made among the alternatives. (The criteria used to select the Default is irrelevant to the invention.) In FIG. 4, the first (or top) sub-allocation identifies the default sub-allocation. Thus, the Default attribute of the Stock Definition of Model A identifies Small Cap as the default sub-allocation for the Stock Definition.

In this example Model, many of the Level II Definitions include an Availability attribute and a Default attribute corresponding to Level II Definitions. For example, the Small Cap Definition of Level II in Model A includes an Availability attribute identifying the mutual funds (or other investments or Definitions) that are available for this Definition. Likewise, one of the available mutual funds (or other investment or Definition) is identified by the Default attribute of the Small Cap Definition as the default sub-allocation. The sub-allocations of the Availability and Default attributes are referred to generally in the figure as "Fund-Level Allocations" and are not specifically shown.

4. Investments

In addition to, or instead of, identifying other Definitions as an available sub-allocation, an Availability attribute may identify a particular investment, such as a particular stock or mutual fund. Referring to FIG. 4, the Level II Small Cap Definition of Model A has an Availability attribute that identifies particular mutual funds (as indicated by the phrase "Fund-Level Allocations" in Level III of the figure). Similarly, in addition to, or instead of, identifying other Definitions as the default sub-allocation, a Default attribute may identify a particular investment, such as a particular stock or mutual fund.

Likewise, a Level may be comprised of any combination of Definitions and investments. For example referring to FIG. 4, Level III of Model A includes only investments (e.g., mutual funds) while Level I of Model B includes two Definitions (Stock and High Yield bonds) and one investment, a Money Market.

In some Models, it may also be necessary to further define each investment found in the Model. For example, a Money Market investment is a one hundred percent (100%) cash investment. Likewise, stock in a particular company is a one hundred percent (100%) equity investment. However, a particular mutual fund might hold ten percent (10%) of its assets in cash and ninety percent (90%) of its assets in stock. Thus, in some Models, one investment might be available to more than one Definition and some investments may constitute an allocation of more than one Definition.

5. Rebalancing at a Particular Level

Each Model may be rebalanced at a different Level and the Model Creator must also establish the Level at which rebalancing occurs. As shown in FIG. 4, Model C illustrates a Model in which the rebalancing is performed at Level II. As shown in the figure, the total percentages of the Definitions in Level I (Stock, Bond, Cash) sum to one hundred percent (100%). Because the rebalancing of the CAAM is performed at Level II, Level I may be used simply for reporting purposes.

The percentages of the sub-allocations of each Definition of Level I sum to one hundred percent (100%). For example, in Model C the percentages of the Small Cap (50%), Aggressive Growth (20%), Growth & Income (10%), Growth (10%), and Foreign (10%) sub-allocations of Stock sum to one hundred percent (100%) and, therefore, identify the Model's sub-allocations for stock. Thus, at each rebalancing, the present invention will rebalance the composite assets of Stock ensuring that sixty percent (60%) of the assets are in stock and to ensure fifty percent (50%) of the stock is in Small Cap stock investments, twenty percent (20%) is in Aggressive Growth stock investments, ten percent (10%) is in Growth & Income stock investments, and ten percent (10%) is in Growth stocks, and ten percent (10%) is in Foreign stock investments according to Level I of Model C. Likewise, the Bond and Cash allocations are also rebalanced at Level II.

Model D is an alternate representation of Model C. The same sub-classes that appear in Level II of Model C appear in Level I of Model D. In other words, although the Levels are defined differently, Models C and D have the same asset allocations. Thus, the total of all percentages of Level I of Model D sum to one hundred percent (100%).

6. Distribution Allocation

As discussed, each Definition may include a Default sub-allocation of assets if the transaction costs of such sub-allocation are not greater than transactions costs to alternative sub-allocations.

In addition to, or as an alternative to, the Default attribute, the Model creator may elect to rebalance at a particular Level and to distribute the newly reallocated assets to the sub-allocations according to a Distribution Allocation. Model C of FIG. 4 also illustrates such a Model. For example, Model C may be rebalanced according to Level I allocations so that assets include sixty percent (60%) Stock, thirty percent (30%) Bonds, and ten percent (10%) Cash. The Distribution Allocation for each sub-allocation thereof is shown as a percentage next to each sub-allocation in Level II. Thus, for each new allocation to Stocks, the assets will be distributed according to the proportions indicated by the Distribution Allocations shown in Level II. More specifically, in this example Model, for every new allocation to Stocks, fifty percent (50%) is invested in Small Cap stock investments, twenty percent (20%) in Aggressive Growth stock investments, ten percent (10%) in Growth & Income stock investments, and ten percent (10%) in Growth stocks, and ten percent (10%) in Foreign stock investments. Likewise, the Bond and Cash allocations are also distributed according to the Distribution Allocations of their sub-allocations in Level II.

Each Stock sub-allocation (Small Cap, Aggressive Growth, Growth & Income, Growth, and Foreign) in this example may also have a Distribution Allocation to determine the distribution of assets for that sub-allocation. For example, the Distribution Allocation for sub-allocations of the Small Cap sub-allocation might be fifty percent (50%) to two specific Small Cap mutual funds.

II. Structure and Operation of System, Method, and Computer Program Product of the Present Invention A. Rebalancing The system, method, and computer program product of the present invention manages the rebalancing of assets to achieve the composite asset allocation model in a cost-effective, financially advantageous manner. Instead of rebalancing each investment product according to a Model, the present invention realizes an asset allocation for the investor's composite assets, thereby making use of efficiencies that may be available in each investment product.

In accordance with the present invention, the system manages the rebalancing of assets to achieve the composite asset allocation model so that the rebalancing incurs the least transaction cost. As discussed, transactions costs may be comprised of, for example, capital gains taxes (short and long term), tax penalties, income taxes, surrender charges, commissions, and transaction fees. Transaction costs may also be set to be based imprints on collateral benefits. The system compares the transactions costs associated with the available transactions that could be performed to accomplish the rebalancing to select the most favorable, cost effective transaction. The comparison of potential transactions may be accomplished in any suitable method such as by calculating the transaction cost of each potential transaction and comparing the results to determine the transaction with the most favorable transaction cost. Alternately, the comparison of potential transaction costs may also be accomplished by first eliminating certain potential transactions (e.g., such as transactions that will incur a short term capital gains tax), calculating the transaction costs for the remaining potential transactions, and comparing the results to determine the transaction with the most favorable transaction cost.

As an alternative to the evaluation of each possible alternative transaction, techniques are commonly available, generally in the field of Operations Research, Linear Programming, and the like, for efficiently identifying and evaluating favorable alternative transactions. For example, a commonly used technique for evaluating such transactions is the referred to as the "Greedy Algorithm". As the name implies, the greedy algorithm uses each available low cost option before using a higher cost option. For example, if it is known that the sale of identified assets in one particular product is always less costly than in another, the system of the present invention can be configured to effect the sale of as many of the identified assets in that particular product as required, until rebalancing is achieved, or until all of the identified assets in that particular product are sold. If rebalancing is achieved, no further alternatives need be evaluated. If not, the next least costly sales are identified, and sold until rebalancing is achieved, or until the asset is depleted from this product. If the combination of these sales is sufficient to achieve the rebalancing, no further alternatives need be evaluated. If not, the process is repeated with the next least costly sales.

Figure 2:
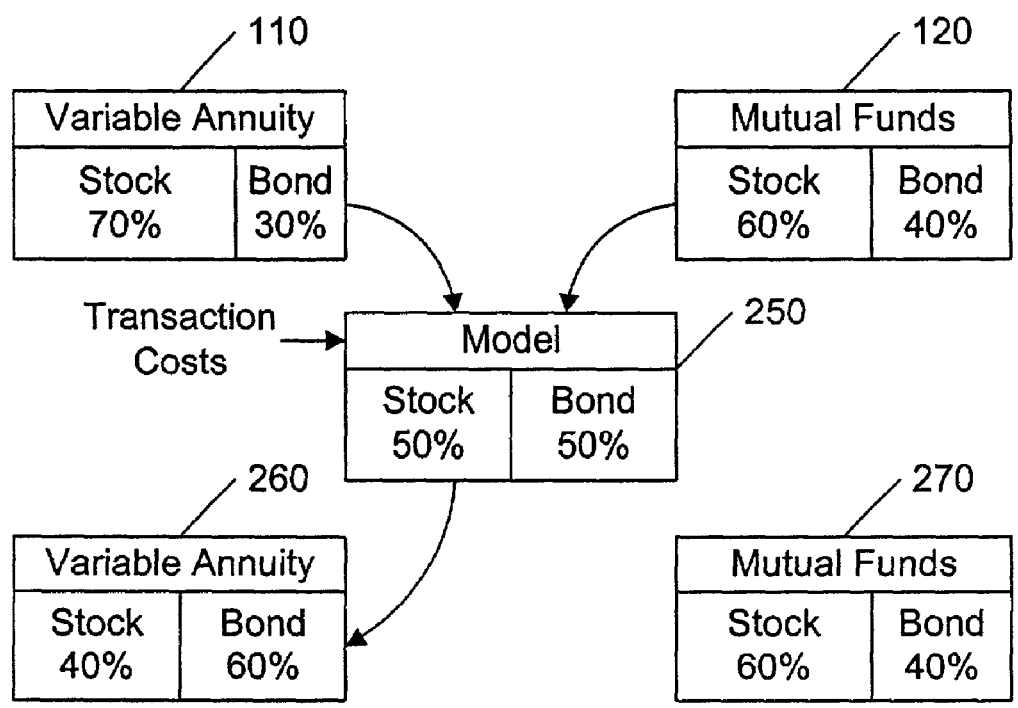
FIG. 2 is a representation in block diagram form of an example asset allocation in accordance with the system, method, and computer program product of the present invention for cost effective, dynamic allocation of assets among a plurality of investments.

FIG. 2 is a representation in block diagram form of an example asset allocation in accordance with the system, method, and computer program product of the present invention for cost effective, dynamic allocation of assets among a plurality of investments. This example uses the same initial conditions of the example of FIG. 1, wherein an investor has a variable annuity 110 having a seventy/thirty (70/30) ratio of stock/bond value, and a set of mutual funds having a sixty/forty (60/40) ratio of stock/bond value. The assumption is that the mutual funds are not held within any tax-preferred program such as an Individual Retirement Account. The example model 250 illustrates the same preferred fifty/fifty (50/50) ratio as the Model 150 in FIG. 1. As noted above, this model may be a fairly static Model, that is set up based on the expected longevity of the investor, or it may be a dynamic model that is continually adjusted, based on predictions for future growth, short term predictions for the markets, performance of the assets classes, or other factors.

In the example of FIG. 2, it is assumed herein that the variable annuity 110 has a total value that is equal to the total value of the mutual funds 120. As is known in the art, it is generally tax-efficient to reallocate positions (relative investments) inside a variable annuity 110, rather than in a set of mutual funds 120. Sales within a mutual fund will generally be subject to capital gains tax, whereas the same activity inside a variable annuity is exempt from such taxation. In accordance with this invention, because the cost of rebalancing the investor's composite assets can be effected with less transaction cost by reallocating the assets within the variable annuity 110, rather than the mutual funds 120, the processing of the Model 250 results in the variable annuity 110 being adjusted from a seventy/thirty (70/30) allocation of stocks and bonds to a forty/sixty (40/60) allocation (at 260), and the mutual funds are unaffected (at 270). As a result of this reallocation, the total value of the variable annuity 110 and the total value of the funds 120 are equal, and therefore the resultant forty/sixty (40/60) allocation in the annuity 260 and the unchanged sixty/forty (60/40) allocation in the funds 270 provide a composite asset allocation of fifty percent (50%) stocks and fifty percent (50%) bonds, as per the Model 250. Because the capital gains tax is avoided, the desired allocation model is achieved at less cost than the conventional independent re-balancing of each of the investor's investment products as described with respect to the conventional rebalancing of FIG. 1. In addition, because assets were reallocated within only one investment product (the variable annuity) resulting in fewer total reallocations as compared to the example of FIG. 1, other transaction costs (e.g., broker fees) are also reduced.

B. Fee Recovery

Each transaction effecting rebalancing has an associated transaction cost. Different transactions, or different parts of a transaction, may incur different transaction costs, and a particular transaction may affect multiple products. Some of these costs may be expenditures or fees, while others may not be expenditures, such as capital gains taxes. In a conventional asset allocation rebalancing, fees are funded within each product independently. However, in many cases it may be possible to recover the fees through liquidation of any assets selected by the asset manager (e.g., the investment advisor or the investor). Thus, the present invention further reduces transaction costs by determining the most cost effective means of recovering fees.

In one embodiment of the present invention, the source of the fee payment can be independent of the one or more products that are used to effect the rebalancing. In accordance with this invention, the recovery of fees is accomplished using an assessment of transaction costs, or gains, associated with alternative means for funding the fees, and the most cost-effective alternative is selected, using an analogous process to the process discussed above for selecting the most cost-effective alternative for rebalancing. More specifically and as discussed above, the process selects the most cost effective means of recovering the fees by considering the costs of taxes, broker fees, benefits impact, and other sources of transaction costs.

In a preferred embodiment, a hierarchy of fee liquidation rules are used to determine how the fees are recovered. The fee liquidation rules will, in most cases, be dependent on the investment products and assets thereof. The rules may be as simple as indicating that a particular account (e.g., an appreciated cash account) should be used to pay all fees until that account is depleted. After that account is depleted, the liquidation rules may identify a second account from which fees are recovered, and so on.

Some investment products, however, may require that the fees for trades of the investment product's assets be recovered from assets within the investment product or directly from the asset or assets being traded. Even if not a requirement, in some cases, it may be more desirable to recover fees from within the investment product. Thus, a more complicated set of liquidation rules may identify assets in certain investment products to be used for the most economically advantageous recovery of fees for trades within that investment product. If the fee is not for a trade within such an investment product, then the rules identify an alternate source of assets for payment of the fee, which would be the most economically advantageous source of recovery of the fee from all of the available investment products' assets in the investor's portfolio. In other words, the fee can be recovered from an asset in an investment product that is different from the investment product in which the asset has been traded. In addition, the rules may indicate that the investor should be billed for payment of some or all of the fees.

For example, referring to the Model and transaction of FIG. 2, it may be more efficient to liquidate shares of the mutual fund 120 to recover the fees, even though the rebalancing was effected solely by the annuity 110. This efficiency arises because it may be more tax-efficient to liquidate assets of an appreciated mutual fund (on which a capital gains tax has accrued) for a tax deductible expenditure, than to liquidate funds of the annuity on which no capital gains tax has accrued.

C. System Software

The system and method of the present invention is, preferably, implemented in a programmed general purpose computer running a computer program comprised of software modules implementing the process of dynamic, cost efficient allocation of assets among a plurality of investment products of the present invention. The architecture, design, modules, and code of the software of the present invention could be implemented in a variety of ways and the manner in which it is implemented is largely a matter of design choice well within the ordinary skill level of those skilled in this art. Further, the data stored in memory and used by the computer program is dependent on the software implementation of the present invention.

As discussed above, each investor shall have an associated composite asset allocation Model (CAAM), such as fifty percent stock and fifty percent bonds, which is stored in the computer system memory. This information may be received electronically or inputted manually by the investor or an administrator. The CAAM may be created for a specific investor, group of investors or type of investor.

As discussed above, the CAAM includes associated Levels, investments, Distribution Allocations, Definitions, Definition attributes, and Allocation Definitions. Thus, all the information relating to the CAAM, including its associated Levels, Definitions, Definition Attributes, Distribution Allocations, investments, Allocation Definitions, and initial investment allocations is stored in memory.

As discussed, the rebalancing process of the present invention is dynamic, and the assets may be rebalanced quarterly, monthly or at any time period desired. The assets may also be rebalanced upon the occurrence of an event or trigger. For example, the present invention may automatically initiate a rebalance upon detecting 1) that the assets are out of balance a predetermined degree or percentage; 2) a withdrawal or deposit; 3) the investor has reached a certain age (at which time the assets may be rebalanced according to a new CAAM); 4) the death of an investor, coinvestor, or dependent of the investor; 5) certain market timing signals; 6) certain technical indicators; and/or 7) a change in the status of assets not in the CAAM (e.g., selling of investor's real estate). Some of this information may be detected automatically (supplied electronically from a remote source) while other information may be supplied to the computer system by the investor or administrator. Thus, the criteria for determining when to initiate rebalancing, whether it is comprised of time periods and/or events, is stored in the memory of the computer system.

The memory of the computer system also stores information relating to the rebalancing technique utilized to implement the present invention. For example, information relating to the transaction costs associated with each investment may be stored in memory. More specifically, the broker fees for buying and selling assets in an investment may be stored. Other transaction cost information may relate to the tax treatment of selling or buying assets in an investment, which when considered in combination with the investor's tax status and/or tax bracket, is used to calculate the transaction cost of selling or buying the assets in a particular investment product. For example, the computer system might store information indicating that the sales of assets invested in a money market will be treated as ordinary income. Thus, the computer system can use the information relating to the tax treatment of the sale of those assets (ordinary income) with information of the investor's tax bracket to calculate the transaction costs associated with selling those assets. As will be evident to one skilled in the art, any information necessary to perform the desired comparison of transaction costs may be stored in memory. Other information necessary to perform the desired comparison of transaction costs may be retrieved just prior to rebalancing and supplied, for example, by a third party computer system. In addition, the computer system also stores in memory other data necessary to implement the present invention, as would be evident to one skilled in the art, such as the date, information relating to the investor (e.g., contact information, birth date, tax bracket, types of income, etc.), anticipated withdrawal information (e.g., dates, amounts, accounts), the initial deposits in each account (the basis), and the dates of the initial deposits and purchases of equities.

Figure 3:
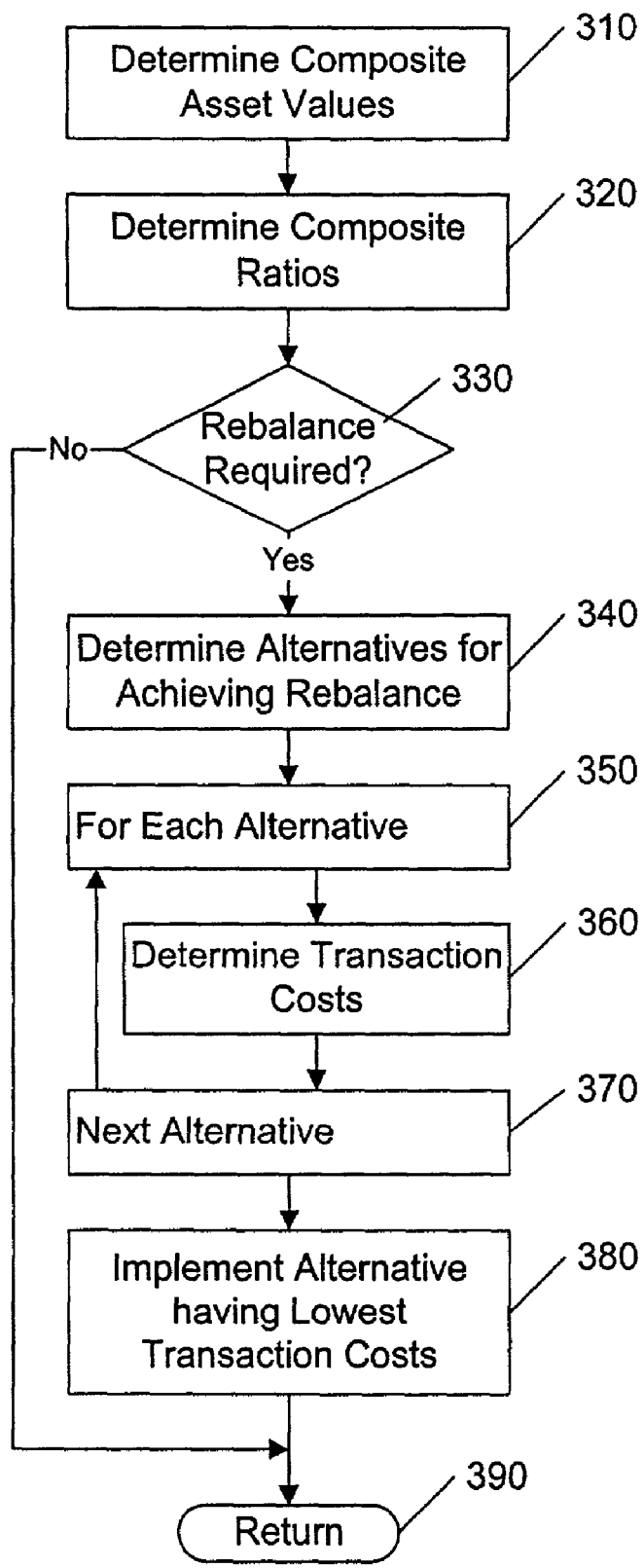
FIG. 3 is a flow diagram representing the method steps for implementing an example asset allocation in accordance with the system, method, and computer program product of the present invention for cost effective, dynamic allocation of assets among a plurality of investments.

FIG. 3 is a flow diagram representing the method steps for implementing an example asset allocation in accordance with the system, method, and computer program product of the present invention for cost effective, dynamic allocation of assets among a plurality of investments. Note that, as compared to the conventional independent asset allocation process, the asset-allocation process of this invention is based on a composite value of the investor's assets or, more specifically, a composite value of the investor's assets that are identified for inclusion in the cross-product allocation process. As discussed above, the cross-product asset allocation process of the present invention may, in a preferred embodiment of the present invention, be implemented using one or more software modules of a computer program.

The computer program implementing the present invention determines the composite asset value at step 310. As an example, the composite asset values might be $120,000 of stock and $80,000 of bonds. At step 320, the corresponding composite asset allocations, or percentages, are determined, which in this example would be sixty percent (60%) stock and forty percent (40%) bonds.

At step 330, the computer program compares the current composite asset allocation to a given CAAM to determine whether rebalancing is required. It is preferable that rebalancing occurs only if the current composite asset allocation differs from the CAAM a predetermined threshold percentage. As discussed, each rebalancing has an associated transaction cost. Thus, the current composite asset allocation must differ sufficiently from the CAAM to economically justify rebalancing and paying the transaction cost.

Referring to the example of FIG. 2, if the CAAM 250 called for a desired sixty-five/thirty-five (65/35) composite asset allocation between stocks and bonds, no rebalancing would be required because the asset allocation of seventy/thirty (70/30) of the annuity 110 and the sixty/forty (60/40) asset allocation of the funds 120 provides the desired sixty-five/thirty-five (65/35) composite asset allocation. This decision not to rebalance is in contrast to the conventional rebalancing process of FIG. 1 in which achieving the desired sixty-five/thirty-five (65/35) allocation would require a sale of stock and purchase of bonds in the variable annuity 110, and a sale of bonds and purchase of stocks in the funds 120, as discussed above. Thus, by basing the rebalancing decision on the composite of the investor's assets from a variety of products, the overall degree of required rebalancing can often be substantially reduced.

The process steps 340-380 are presented hereinafter for ease of reference and understanding. Alternative methods for choosing the least-costly transaction are common in the art, and at least one such alternative is presented further below.

At step 340, the computer program implementing the present invention determines the available transactions for rebalancing, using any of a variety of multi-variate techniques common in the art. In the simplest application, each available transaction may merely be the exchange of assets from within a corresponding available account, similar to the example of FIG. 2, wherein the alternatives were 1) to exchange the assets within the annuity 110, or 2) exchange the assets within the funds 120. A more exhaustive list of alternative transactions would include exchanging assets within both the annuity 110 and the funds 120. In like manner, if a particular product had insufficient resources to effect a composite rebalancing, the transaction might be accomplished through reallocation of that particular product and other products to complete the rebalancing. Each identified available transaction is a combination of liquidations and sales of assets, involving one or more products, so as to achieve a rebalanced position based on the Model parameters.

In addition, the CAAM may impose restrictions on the potential transactions that are available. For example, the Model Creator may set a minimum value that a particular investment product (e.g., a money market) may have. Reallocations out of the investment product that reduce the value of the investment product below the predetermined minimum would be prohibited, thereby removing the associated transaction(s) from the potential transactions available for rebalancing. Other restrictions may also be imposed by the Model Creator or by the investment product itself (e.g., a minimum account balance).

After the available transactions are identified, the present invention compares the transaction costs of the available transactions. In the present example, this task is accomplished by execution of a software module of the computer program that determines the cost of implementing each available transaction in the loop 350-370. The least costly alternative is selected and implemented at step 380. As noted above, the transaction cost is computed at step 360 for each alternative and is comprised of such items as fees, commissions, taxes, surrender charges, tax penalties, and others costs.

After the most favorable transaction is selected, the computer program implementing the present invention performs a transaction cost fee recovery comparison. As discussed above, the recovery of fees is accomplished using an assessment of transaction costs, or gains, associated with alternative means for funding the fees, and the most cost-effective alternative is selected and implemented, using an analogous process to the process discussed above for selecting the most cost-effective alternative for rebalancing.

After the most favorable transaction for achieving the CAAM is determined, the computer program identifies the transaction and, in a preferred embodiment, includes software for performing the actual purchasing and selling of assets (trades) that must be performed in order to carry out the reallocation process. Preferably, the computer system implementing the present invention is coupled to a computer system (e.g., via a computer network) that executes trades of the investments held in the Model. For example, the computer system of the present invention may electronically transmit requests to buy or sell stocks (e.g., a market order) on the NASDAQ exchange in order to carry out reallocations. Likewise, the computer system of the present invention may electronically transmit requests to buy or sell mutual funds to the institutions managing the mutual funds or to other computer systems that can carry out the requested trades. Thus, the computer system of the present invention preferably includes the appropriate hardware and software modules for interfacing with the desired computer systems and/or networks.

Consequently, the reallocation executing software of the computer system implementing the present invention will transmit requests to buy and sell quantities of assets and, in response to the request, receive information relating the value of the assets bought and sold such as the shares bought or sold. The received information is stored appropriately to update the information relating to the investments in the Model. For example, the computer system may transmit a request to sell a specific value (e.g., $10,000) of a particular investment such as a mutual fund. In response, the computer system would receive information of the number of shares sold in order to liquidate the desired value of the mutual fund. The computer program will then reduce the units (e.g., shares) of that investment by the number of units sold and store the new number of units in memory.

The modifications of the values stored in memory of the assets in the Model may be performed immediately after calculating the amounts to be reallocated and/or after receiving confirmation and/or information after the reallocation (e.g., a trade) has been completed.

Some investments in the Model may be offered by the same financial institution that is implementing the present invention. For these investments, the computer system implementing the present invention may execute the transaction (or that portion of the transaction) itself, through the manipulation of internal databases and other appropriate actions.

In an alternate embodiment, the computer system may produce information (e.g., display or print information) that is sufficient to enable a person to execute the appropriate trades to carry out the transaction. The computer system would then receive information relating to the executed trades as a manual input or as an electronic data transmission as described above.

D. System Hardware

Figure 5:
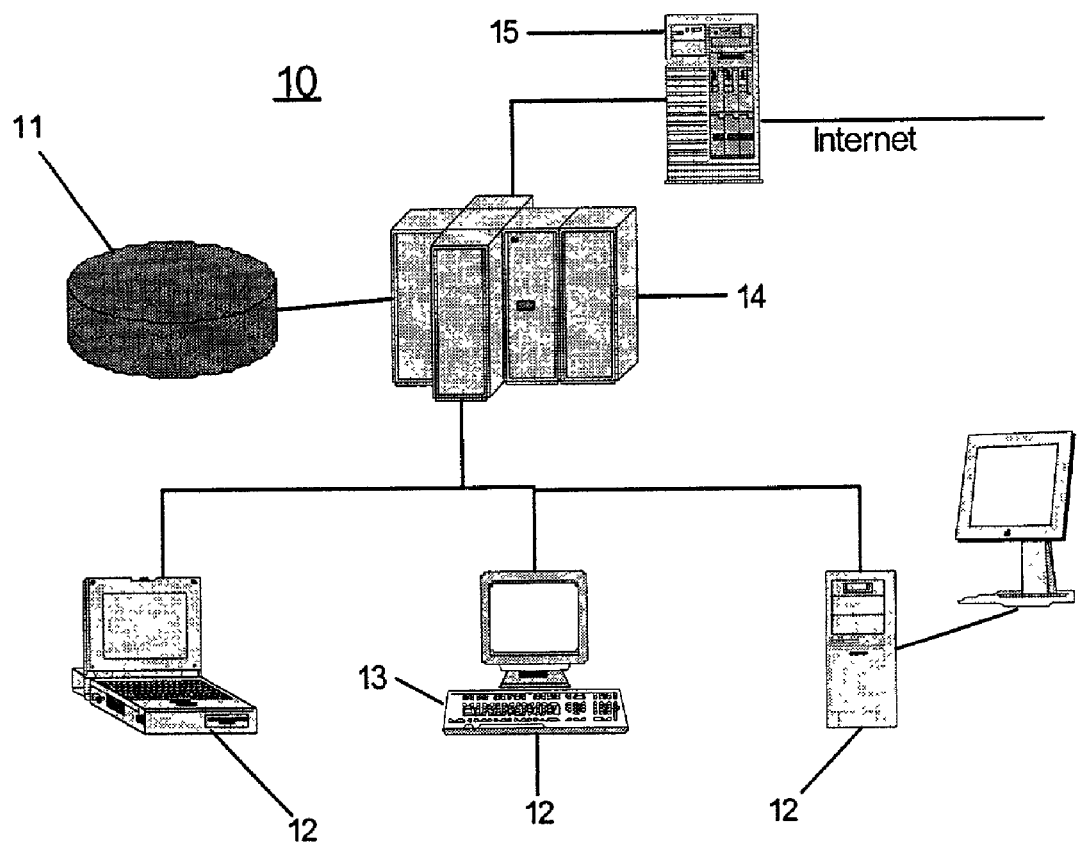
FIG. 5 is an illustration of a representative computer system for implementing the system, method, and computer program product of the present invention for cost effective, dynamic allocation of assets among a plurality of investments.

FIG. 5 is an illustration of a representative computer system for implementing the system, method, and computer program product of the present invention for cost effective, dynamic allocation of assets among a plurality of investments. With reference to FIG. 5, as described above, the dynamic asset allocation process of the present invention may be advantageously implemented using a computer program executing on a computer system 10 having a processor or central processing unit 14, such as, for example, an IBM AS/400, having a memory 11, such as, for example, a hard drive, RAM, ROM, a compact disc, magneto-optical storage device, and/or fixed or removable media, having a one or more user interface devices 12, such as, for example, computer terminals, personal computers, laptop computers, and/or handheld devices, with an input means, such as, for example, a keyboard 13, mouse, pointing device, and/or microphone. The computer program is stored in memory 11 along with various other data including investor information, investment data, account information, CAAMs, asset information, allocation of investor assets, transaction cost data, fee data, communication information, and other parameters and data necessary to implement the method of the present invention.

In addition, the computer system 10 is coupled to a computer network, which may also be communicatively coupled to the Internet and/or other computer network to facilitate the buying and selling of investments electronically through an electronic communications network (ECN) such as, for example, Island (ISLD); Instinet (INCA); Terranova (TNTO); Attmin (ATTN); Bloomberg Tradebook (BTRD); Spear, Leads, & Kellogg (REDI); and NASDAQ.

Optionally, information and other data including investor information, investment data, account information, CAAMs, asset information, allocation of investor assets, transaction cost data, fee data, communication information, and other parameters and data necessary to implement the method of the present invention could be stored externally of the system 10 and received through the Internet or other communication network in a manner well-known in the art for processing by the system 10. Also, the system software for implementing the method of the present invention could be implemented, wholly or partly, on a personal computer, laptop computer, handheld device, or like communication device or appliance for performing some or all of the asset allocation, rebalancing, and transaction processing steps of the present invention. The computer system 10 of the present invention may also include a web server 15.

While the present invention has been described in the context of rebalancing to achieve a desired composite asset allocation model, the invention may also find application anytime allocations or reallocations are performed and it is desirable to select an economically favorable transaction from a set of potential transactions to perform the allocations or reallocations.

The computer program and software modules of the system, method, and computer program product of the present invention can be implemented using any operating system, and associated hardware including, but not limited to, Palm OS, Microsoft Windows CE, Unix, Linux, VMS, IBM, Microsoft Windows NT, 95, 98, 2000, ME, and XP, and the like.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

For example, limits may be set on the positions held in some or all of the investor's products. In the example of FIG. 2, whenever stocks need to be sold, they will be sold from the annuity 110. With time, the annuity 110 may be depleted of stocks, and will comprise only bonds. The investor who purchased the annuity 110 and funds 120 is likely to have done so based on particular long-term investment objectives for each. These long-term objectives, however, may not be achievable if the relatively short-term rebalancing process is applied indiscriminately. An investor may therefore define a set of upper and/or lower bounds for the positions in each product, such that the cross-product asset allocation process of this invention is prevented from depleting or augmenting particular assets beyond the set bounds. For example, the investor may specify that any rebalancing must assure that the asset allocation of stocks to bonds is between thirty-five/sixty-five (35/65) and sixty-forty (60/40) in the annuity 110, and between forty/sixty (40/60) and eighty/twenty (80/20) in the funds 120. As long as the allocations are within these specified limits, rebalancing is effected based on the transaction costs. When the limit is reached, the rebalancing is forced to choose a more costly transaction, so as to prevent the depletion of an asset from an account below its specified minimum, or to prevent the accumulation of an asset in the account above its specified maximum. These and other system configuration and optimization features will be evident to one of ordinary skill in the art in view of this disclosure, and are included within the scope of the following claims.

Likewise, while the preferred embodiment of the present invention has been described using a single model, the invention may also be utilized to reduce transaction costs among a plurality of models. For example, a single investor may have one financial goal (such as saving money for the investor's children's college education) with an associated first model (that is designed according to the time horizon, risk tolerance and other well-known factors for that goal) and a second goal (such as saving for retirement) with an associated second model. Thus, even though the investor has more than one model, the present invention minimizes the transaction costs and costs of fee recovery across the plurality of models used.

Obviously, numerous modifications and variations of the present invention are possible in light of the above teachings. It is therefore to be understood that within the scope of the appended claims, the invention may be practiced otherwise than as specifically described herein.

What is claimed is:

1. A method of managing an investment portfolio comprised of assets allocated among a plurality of investments in accordance with a preferred asset allocation using a computer system having a memory, the method comprising the steps of:
storing information relating to the preferred asset allocation in the memory;
storing information relating to the plurality of investments in the memory;
using the computer system, determining the current asset allocation of the investment portfolio;
using the computer system, comparing said current asset allocation with said preferred asset allocation to determine whether said current asset allocation is substantially in accordance with said preferred asset allocation;
in response to the determination that said current asset allocation is not substantially in accordance with said preferred asset allocation, identifying one or more transactions and the associated transaction costs for reallocating the assets of the investment portfolio to be substantially in accordance with said preferred asset allocation, the identification made using the computer system; and
using the computer system, reallocating the assets of the investment portfolio to be substantially in accordance with said preferred asset allocation the reallocation using one or more transactions selected by the computer system from the one or more identified transactions as having the lowest associated transaction costs.

2. The method of claim 1, wherein said step of identifying one or more transactions and the associated transaction costs includes the steps of:
determining at least two transactions for reallocating the assets of the investment portfolio to be substantially in accordance with said preferred asset allocation;
determining a transaction cost of each of said at least two transactions; and
comparing said transaction costs of said at least two transactions.

3. The method of claim 1, wherein said step of determining the current asset allocation is performed in response to the occurrence of an event.

4. The method of claim 1, wherein said step of determining the current asset allocation is performed periodically.

5. The method of claim 1, further comprising the steps of:
determining a transaction fee of said transaction cost of said identified transaction; and
selecting a fee recovery transaction for recovering said transaction fee based, at least in part, on said transaction cost of said selected fee recovery transaction.

6. The method of claim 5, further comprising the steps of:
determining at least two fee recovery transactions for recovering said transaction fee; and
comparing said transaction costs of said at least two fee recovery transactions.

7. The method of claim 1, wherein:
said investment portfolio includes a plurality of investment products and said preferred asset allocation is a composite asset allocation model; and
said one or more identified transactions do not distribute the assets of each investment product according to said preferred asset allocation.

8. The method of claim 1, further comprising the step of receiving said preferred asset allocation as an input from a user.

9. The method of claim 8, wherein said input from said user includes information relating to a first level and elements of said first level, said elements of said first level including at least one member of a group of asset classes, asset subclasses, and investments.

10. The method of claim 9, wherein said preferred asset allocation includes a distribution of assets among said elements of said first level.

11. The method of claim 9, wherein:
said input from said user includes information relating to a second level and elements of said second level, said elements of said second level including at least one member of a group of asset classes, asset sub-classes, and investments; and
said preferred asset allocation is a distribution of assets among said elements of said second level.

12. The method of claim 1, further comprising the steps of:
transmitting a request to trade an asset to facilitate execution of said one or more selected transactions.

13. The method of claim 1, wherein said transaction costs include at least one of:
a capital gains tax,
a tax penalty,
a surrender charge,
a commission, and
a transaction fee.

14. The method of claim 3, wherein said event includes at least one of:
said current asset allocation is out of balance with said preferred asset allocation by a predetermined percentage,
a withdrawal from the investment portfolio,
a deposit to the investment portfolio,
the investment portfolio investor or other selected individual or entity has reached a predetermined age,
the investment portfolio investor or other selected individual or entity dies,
a market timing signal,
a technical indicator, and
a change in status of assets of the investment portfolio investor not part of the investment portfolio.

15. A computer program embodied on a computer readable medium for enabling a computer system to manage an investment portfolio comprised of assets allocated among a plurality of investments in accordance with a preferred asset allocation, the computer program comprising:
a computer code segment which determines an asset allocation for the investment portfolio;
a computer code segment which compares said asset allocation with said preferred asset allocation;
a computer code segment which identifies one or more transactions and the associated transaction costs for reallocating the assets of the investment portfolio to be substantially in accordance with said preferred asset allocation; and
a computer code segment which selects said one or more identified transactions with the lowest associated transaction costs to reallocate the assets of the investment portfolio to be substantially in accordance with said preferred asset allocation.

16. The computer program of claim 15, wherein said computer code segment which identifies one or more transactions and the associated transaction costs includes:

a computer code segment which determines at least two transactions for reallocating the assets of the investment portfolio to be substantially in accordance with said preferred asset allocation;

a computer code segment which determines a transaction cost of each of said at least two transactions; and a computer code segment which compares said transaction costs of said at least two transactions.

17. The computer program of claim 15, wherein determining the current asset allocation is performed in response to the occurrence of an event.

18. The computer program of claim 15, wherein determining the current asset allocation is performed periodically.

19. The computer program of claim 15, further comprising a computer code segment which stores data input from a user that includes information relating to a first level and elements of said first level, said elements of said first level including at least one member of a group of asset classes, asset sub-classes, and investments.

20. The computer program of claim 19, wherein at least a portion of said stored data corresponds to the preferred asset allocation.

21. The computer program of claim 19, further comprising:

a computer code segment which stores data input from a user that includes information relating to a second level and elements of said second level, said elements of said second level including at least one member of a group of asset classes, asset sub-classes, and investments; and wherein at least a portion of said information relating to said second level corresponds to the preferred asset allocation.

22. The computer program of claim 15, further comprising a computer code segment which transmits a request to trade an asset to facilitate execution of said one or more identified transactions.

23. The computer program of claim 15, wherein said transaction costs include at least one of:

a capital gains tax, a tax penalty, a surrender charge, a commission, and a transaction fee.

24. The computer program of claim 17, wherein said event includes at least one of:

said current asset allocation is out of balance with said preferred asset allocation by a predetermined percentage, a withdrawal from the investment portfolio, a deposit to the investment portfolio, the investment portfolio investor or other selected individual or entity has reached a predetermined age, the investment portfolio investor or other selected individual or entity dies, a market timing signal, a technical indicator, and a change in status of assets of the investment portfolio investor not part of the investment portfolio.

25. The computer program of claim 15, wherein said computer code segment which selects said one or more identified transactions includes a code segment which substantially implements the greedy algorithm.

26. A method for managing an investment portfolio comprising a plurality of assets, the plurality of assets having a distribution among a plurality of investment products, the method implemented using a computer system, the method comprising:

using the computer system, defining a preferred asset allocation of the investment portfolio among the plurality of assets;

using the computer system, determining whether an existing distribution of the assets of the investment portfolio differs at least a predetermined degree from said preferred asset allocation;

in response to the determination that said existing distribution of the assets differs from said preferred asset allocation at least said predetermined degree, identifying at least two transactions for reallocating the assets substantially to said preferred asset allocation, the identification made using the computer system;

using the computer system, comparing a transaction cost of said at least two transactions; and using the computer system, selecting a transaction for reallocating the assets substantially to said preferred asset allocation based, at least in part, on said comparison of said transaction costs.

* * * * *